July 6, 1965 J. J. ORSINO 3,193,733

COUNTER DRIVING CIRCUIT

Filed Sept. 27, 1962

INVENTOR.
JOSEPH J. ORSINO

BY Lindsey, Prutzman and Hayes

ATTORNEYS 3,193,733
COUNTER DRIVING CIRCUIT
Joseph J. Orsino, Melrose, Mass., assignor to Veeder-Root Incorporated, Hartford, Conn., a corporation of Connecticut
Filed Sept. 27, 1962, Ser. No. 226,569
8 Claims. (Cl. 317—148.5)

Figure 1:
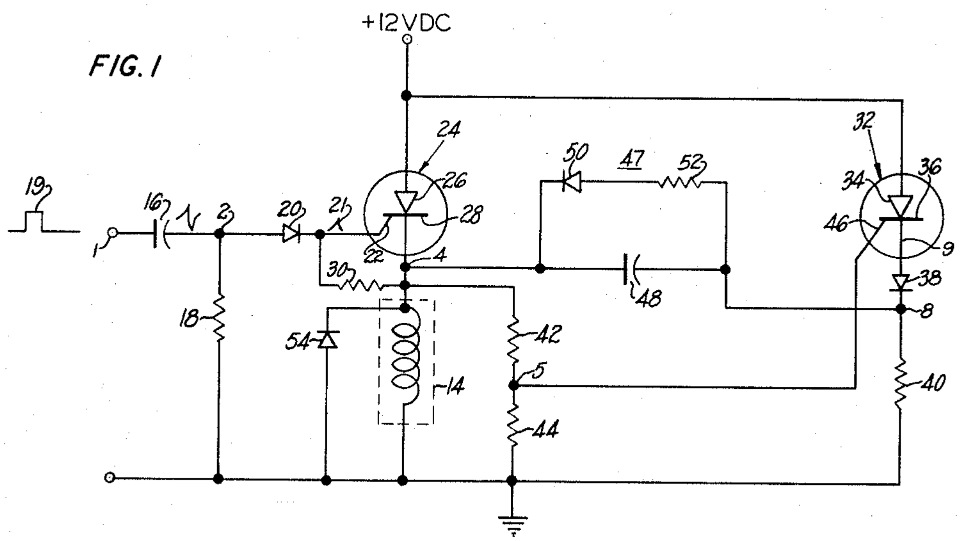

This invention relates generally to a pulse-operated, electromagnetic counter driving circuit and more particularly to an improved electromagnetic counter driving circuit incorporating a semiconductor controlled rectifier and a semiconductor controlled switch.

The principal object of this invention is to provide an electromagnetic counter driving circuit which responds to input counter pulses of extremely short duration.

Another object of this invention is to provide an electromagnetic counter driving circuit which responds to a short, low-level input pulse to provide a long, high-level counter drive pulse.

Still another object is to provide a counter drive circuit which is insensitive to spurious input pulses caused by contact bounce.

A further object of this invention is to provide a counter drive circuit which draws an extremely small amount of current in its OFF condition.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
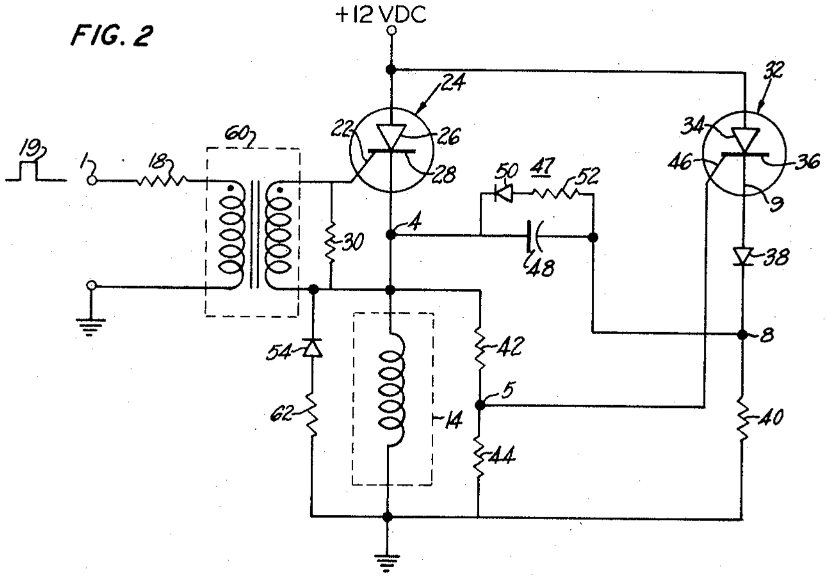

In the drawings:

FIG. 1 is a schematic circuit diagram of an electromagnetic counter driving circuit embodying this invention; and FIG. 2 is a schematic circuit diagram of a modification of the circuit shown in FIG. 1.

With reference to FIG. 1, there is shown an electromagnetic counter driving circuit including a counter solenoid coil 14 which, when energized, will magnetically operate a mechanical counting mechanism (not shown). The driving circuit includes an input terminal 1 which is connected to a differentiating circuit including a capacitor 16 and a resistor 18. When a positive count input pulse 19 is applied to terminal 1, it is differentiated to provide positive and negative trigger pulses at the point 2. Diode 20 blocks the negative trigger pulse and allows the positive pulse 21 to be applied to the gate electrode 22 of a silicon controlled rectifier 24 whose anode 26 is connected to a positive twelve volt D.C. supply. The cathode 28 of the silicon controlled rectifier 24 is connected through counter solenoid coil 14 to ground. A temperature stabilizing resistor 30 is connected between the cathode of diode 20 and cathode 28 of the controlled rectifier 24.

A silicon controlled switch 32 also has its anode 34 connected to the D.C. supply and its cathode 36 connected through a diode 38 and a resistor 40 to ground. A voltage divider comprising resistors 42 and 44 is connected between ground and the cathode 28 of controlled rectifier 24. The gate electrode 46 of the controlled switch 32 is connected directly to the junction 5 between resistors 42 and 44. Connected between cathode 28 of controlled rectifier 24 and cathode 36 of controlled switch 32 is a parallel circuit 47 including a timing capacitor 48 connected in shunt with a diode 50 and a resistor 52 which are connected in series.

In operation, input terminal 1 is normally at ground or zero potential, and silicon-controlled rectifier 24 and silicon-controlled switch 32 are OFF or nonconducting. In this normal or turned-off condition of the counter drive circuit, it draws from the power supply a maximum current of eleven microamperes at 25° C. An input counting pulse of approximately two milliamperes and a duration of from 1 to 25 milliseconds is applied to the input terminal 1, differentiated by capacitor 16 and resistor 18 to provide the positive trigger pulse 21 which is passed by diode 20 to the gate electrode 22 of silicon-controlled rectifier 24.

The silicon-controlled rectifier, operating in a manner similar to the well-known thyratron, is normally OFF or nonconducting. However, when positive pulse 21 appears on gate electrode 22, the gate-cathode circuit is forward biased and controlled rectifier 24 fires so that current flows from the twelve volt D.C. supply through the controlled rectifier and counter solenoid coil 14 to ground. Because of the thyratron action of controlled rectifier 24, pulse 21 need have a duration of only ten microseconds in order to fire the controlled rectifier. The rectifier will remain in its ON or conducting state until positively turned off as will be described later. The ON condition persists even though the input pulse at terminal 1 disappears, i.e., gate electrode 22 loses control once controlled rectifier 24 is conducting. The resistor 30 provides a stable OFF condition of the circuit throughout the operating and nonoperating temperature range of the circuit.

When controlled rectifier 24 turns ON, the voltage at point 4 goes from ground to approximately +11.5 volts. The +12 volts D.C. power supply, in addition to supplying current to solenoid coil 14, also charges capacitor 48 through resistor 40 to ground. Even though capacitor 48 will ultimately charge to approximately +11.5 volts, the RC time constant of resistor 40 and capacitor 48 is chosen to be large with respect to the width of the input pulse applied to terminal 1 so that point 8 initially assumes a potential of approximately +11.5 volts which is developed across resistor 40 by the capacitor charging current. However, the potential at point 8 falls exponentially to zero at a rate determined by the time constant as capacitor 48 charges to 11.5 volts. When controlled rectifier 24 is ON, it also supplies current through resistor 42 and 44 to ground, thereby developing a potential of approximately +5.3 volts at point 5 which in turn is directly connected to gate electrode 46 of controlled switch 32. Since diode 38 has approximately a 0.5 volt forward voltage drop, when point 8 falls to approximately +4 volts, gate electrode 46 is sufficiently forward biased with respect to the cathode 36 to fire the controlled switch 32 into an ON or conducting condition, i.e., the potential between point 5 and point 9 rises to the rated gate firing voltage of the controlled switch. It requires about fifteen milliseconds for point 8 to fall from 11.5 volts to 4 volts. Diode 38 prevents the gate-to-cathode voltage from exceeding its rated value.

The RC time constant of resistor 40 and capacitor 48 is designed to be approximately 12 milli-seconds. At the instant control switch 32 fires, the voltage at point 8 rises momentarily to approximately +11.5 volts to provide a positive voltage swing or pulse which is coupled through circuit 47 and superimposed on the +11.5 volts already appearing at point 4 whose potential is raised momentarily to +14.5 volts. Since only +12 volts is applied to anode 26, controlled rectifier 24 is turned OFF, i.e., rendered nonconducting.

When the controlled rectifier 24 is turned OFF, counter solenoid coil 14 is disconnected from the twelve volt power supply and its magnetic field collapses to produce an exponentially rising negative pulse which is clamped to a maximum value of −0.5 volt by the diode 54 which is connected between the upper end of coil 14 and ground.

The negative voltage across coil 14 falls exponentially at a rate determined by the RC time constant of the coil discharge path which includes the approximately 24 ohm resistance of coil 14, the coil reactance and parallel circuit 47. The complete timing cycle during which counter-driving solenoid coil 14 is continuously energized is, therefore, seen to be dependent upon the values of the components forming the timing circuit, and for the maximum pulse repetition rate of forty input pulses per second applied to input terminal 1, the timing cycle is designed to extend over a minimum time of twelve milliseconds.

When controlled rectifier 24 turns OFF, point 4 is forced toward zero volt or ground to produce a current flow through capacitor 48 for a sufficiently long time to cause the anode current flowing through the controlled switch 32 to fall below its rated holding current for its rated turn-off time which is in the neighborhood of a few microseconds. Controlled switch 32 therefore also turns off and the circuit is again in its normal state ready to receive another input counter pulse at terminal 1. When in this state, the counter-driving circuit draws approximately only eleven microamperes of current at a temperature of 25° C.

An actual set of values for the components used in the circuit shown in FIG. 1 are listed below:

| | |
|---|---|
| R18 | 10K, ¼ watt. |
| R30 | 1K, ¼ watt. |
| R42 | 1K, ¼ watt. |
| R44 | 1K, ¼ watt. |
| R52 | 1.8K, ¼ watt. |
| R40 | 5K, ¼ watt. |
| C16 | 0.01 mfd., 25 v. D.C. |
| C48 | 3 mfd., nonpolarized, 25 v. D.C. |
| D20 | IN625. |
| D54 | IN1763. |
| D50 | IN625. |
| D38 | IN625. |
| CR24 | 2N1881. |
| CS32 | 2N885. |

The circuit shown in FIG. 1 operates from a six watt power supply to provide a five hundred milliamperes of driving current through counter solenoid coil 14 upon the application of a two milliamperes input pulse to the input terminal 1. However, when the circuit is in its OFF or normal state, its power consumption is practically negligible since it is in the microwatt range. Furthermore, the circuit is sensitive to input count pulses having a pulse width in the range of from 1 to 25 milliseconds to provide a twelve millisecond current pulse in solenoid coil 14 at a maximum input pulse repetition rate of forty pulses per second.

Furthermore, the pulse-generating circuit (not shown) which supplies the input pulses to terminal 1 usually contains switch contacts which may be subject to bouncing which provides a series of spurious pulses. In a conventional counter drive circuit, these spurious pulses may be erroneously counted as true input pulses; however, the circuit in FIG. 1 is nonresponsive to pulses which occur at the input terminal 1 while the circuit is operating in its timing cycle. In other words, controlled rectifier 24 must be reset to its OFF state before the circuit will again become responsive to input pulses at terminal 1.

The circuit shown in FIG. 2 functions in a manner identical to the circuit shown in FIG. 1 but incorporates a pulse transformer 60 for coupling input terminal 1 to the gate electrode 22 in place of direct coupling used in FIG. 1. Corresponding components of the circuit shown in FIG. 1 and FIG. 2 have been labeled with the same reference numerals. In the FIG. 2 circuit, the resistor 18 combination with a pulse transformer 60 provides the differentiation action provided by the combination of resistor 18 and capacitor 16 in FIG. 1. In addition, a resistor 62 is connected in series with the diode 54. The values of the components used in the circuit shown in FIG. 2 are listed below:

| | |
|---|---|
| R18 | 1K, ¼ watt. |
| R30 | 1K, ¼ watt. |
| R62 | 68, ¼ watt. |
| R42 | 1K, ¼ watt. |
| R44 | 1K, ¼ watt. |
| R52 | 1.8K, ¼ watt. |
| R40 | 13K, ¼ watt. |
| D54 | IN625. |
| D50 | IN625. |
| D38 | IN625. |
| CR24 | 2N1881. |
| CR32 | 2N885. |
| C48 | 1.2 mfd., 25 v. D.C. nonpolarized. |

As will be apparent to persons skilled in the art, various modifications and adaptations of the structure above described will become readily apparent without departure from the spirit and scope of the invention, the scope of which is defined in the appended claims.

I claim:

1. An electromagnetic counter driving circuit comprising an input terminal for receiving input count pulses, a normally non-conducting controlled rectifier, means to feed an input pulse from said input terminal to the gate electrode of said controlled rectifier thereby rendering said rectifier conducting, a counter solenoid coil connected to said controlled rectifier for conducting current simultaneously therewith, a normally non-conducting controlled switch, a timing capacitor connected between said controlled rectifier and controlled switch, an impedance connected to said capacitor and to said controlled switch, said controlled rectifier supplying current to charge said capacitor and develop across said impedance, a bias potential for maintaining said controlled switch non-conducting, said bias potential falling exponentially as said capacitor charges, and means for applying a gate potential to the gate electrode of said controlled switch, said controlled switch becoming conducting when said gate potential exceeds said bias potential by an amount sufficient to fire said switch, the firing of said controlled switch generating a voltage pulse which is coupled through said capacitor to reverse-bias said controlled rectifier thereby rendering said controlled rectifier non-conducting and interrupting the current flowing through said counter solenoid coil.

2. An electromagnetic counter driving circuit as defined in claim 1 wherein said controlled switch is rendered non-conducting by the voltage pulse generated by said controlled rectifier being rendered non-conducting.

3. An electromagnetic counter driving circuit comprising a counter solenoid coil, a normally non-conducting silicon controlled rectifier connected to said solenoid coil, a normally non-conducting silicon controlled switch, a potential source connected to said silicon controlled rectifier and to said silicon controlled switch, a timing circuit having a time constant and interconnecting said silicon controlled rectifier and said silicon controlled switch, means for applying a trigger pulse to the gate electrode of said silicon controlled rectifier to render said rectifier conducting and complete a current path from said source through said coil, said timing circuit coupling to said switch a transient voltage pulse generated when said rectifier becomes conducting to initially maintain said switch non-conducting, means for deriving a gating potential from the current flowing through said controlled rectifier, means for applying said gating potential to the gate electrode of said controlled switch, whereby said gating potential exceeds said transient pulse at the end of a time interval determined by said time constant to render said controlled switch conducting and the potential swing generated by said switch becoming conducting is coupled through said timing circuit to reverse bias said controlled rectifier, thereby rendering said rectifier non-conducting to interrupt the current flowing through said solenoid coil.

4. An electromagnetic counter driving circuit as defined in claim 3 wherein said controlled switch is rendered non-conducting in response to the interruption of said current flowing through said solenoid coil.

5. An electromagnetic counter driving circuit as defined in claim 4 further comprising means connected to said coil for clamping to a predetermined voltage the self-induced voltage generated in said solenoid coil upon said interruption of the current flowing therethrough.

6. An electromagnetic counter driving circuit comprising a controlled rectifier having a first gate, a first anode and a first cathode, a counter solenoid coil connected to said first cathode, a controlled switch having a second gate, a second anode and a second cathode, a source of bias potential connected across said first anode and said first cathode and across said second anode and said second cathode, said controlled rectifier and said controlled switch both being normally non-conducting, a voltage divider connected across the counter solenoid coil and whose junction is connected to said second gate, a timing capacitor connected between said first cathode and said second cathode, a resistor connected to the cathode of said controlled switch for providing a charging path for said capacitor, means to apply a count pulse to said first gate to forward bias said first gate with respect to said first cathode and render said controlled rectifier conducting thereby completing individual current paths through said solenoid coil and said voltage divider and completing a charging path through said capacitor and said resistor, the voltage developed across said divider being coupled to said second gate to provide a second gate bias potential, the transient current flowing through said capacitor initially developing across said resistor a second cathode potential which is greater than said second gate bias potential, said cathode potential falling exponentially at a rate determined by the RC time constant of said resistor and said capacitor until said second gate is sufficiently forward biased with respect to said second cathode to render said controlled switch conducting, the change in potential at said second cathode when said controlled switch becomes conducting being coupled through said capacitor to said first cathode to reverse bias said first cathode with respect to said first anode and render said controlled rectifier non-conducting, thereby interrupting the current flowing through said solenoid coil.

7. An electromagnetic counter driving circuit as defined in claim 6 further comprising a diode-resistor series circuit connected in parallel with said capacitor to provide a discharge path for said coil, and a diode connected between said coil and said first cathode for clamping to a low level the voltage pulse self-induced in said solenoid coil upon the interruption of the current flowing therethrough.

8. An electromagnetic counter driving circuit as defined in claim 7 wherein a sudden change in potential occurs at said first cathode when said controlled rectifier is rendered non-conducting, said change in potential being coupled through said capacitor to render said controlled switch non-conducting.

References Cited by the Examiner

UNITED STATES PATENTS

| | | | |
|---|---|---|---|
| 2,162,508 | 6/39 | Knowles | 317—149 X |
| 3,099,962 | 8/63 | Smith. | |
| 3,113,241 | 12/63 | Yonushka. | |

OTHER REFERENCES

Notes on the Application of the Silicon Controlled Rectifier, General Electric Co., December 1958, pages 36, 37.

MAX L. LEVY, *Primary Examiner.*

SAMUEL BERNSTEIN, *Examiner.*